United States Patent
Sproul et al.

[19]

[11] Patent Number: 5,805,893
[45] Date of Patent: Sep. 8, 1998

[54] ASSEMBLY LANGUAGE PROGRAM CONVERTER

[75] Inventors: Robert C. Sproul, Murphy; John A. Wedel, Plano, both of Tex.

[73] Assignee: Electronic Data Systems Corporation

[21] Appl. No.: 609,692

[22] Filed: Mar. 1, 1996

[51] Int. Cl.$^6$ .............................. G06F 3/00; G06F 9/06; G06F 9/22

[52] U.S. Cl. .................... 395/705; 395/704; 395/709; 364/183.14; 364/261.3; 364/262.8

[58] Field of Search ...................... 395/705, 704, 395/707–709, 183.14, 193.11, 702, 710, 800.32; 364/280.4, 973, 263, 259, 286, 262.4, 267, 254, 267.91, 259.2, 262.8, 243.1, 247.7, 155.1, 161.3, 262.7, 280.5, 282.1, 222.82, 226.4, 920.4

[56] References Cited

U.S. PATENT DOCUMENTS

| | | | |
|---|---|---|---|
| 4,309,756 | 1/1982 | Beckler | 395/709 |
| 4,374,408 | 2/1983 | Bowles et al. | 395/707 |
| 4,864,557 | 9/1989 | Morton et al. | 395/182.04 |
| 5,132,972 | 7/1992 | Hansaen | 395/183.14 |
| 5,142,681 | 8/1992 | Driscoll et al. | 395/709 |
| 5,317,740 | 5/1994 | Sites | 3950/104 |
| 5,335,334 | 8/1994 | Hastings | 395/183.11 |
| 5,471,564 | 11/1995 | Dennnis et al. | 395/706 |
| 5,475,842 | 12/1995 | Gilbert et al. | 395/706 |
| 5,507,030 | 4/1996 | Sites | 395/704 |
| 5,586,330 | 12/1996 | Knudsen et al. | 395/705 |
| 5,644,305 | 7/1997 | Inoue et al. | 341/67 |
| 5,649,203 | 7/1997 | Sites | 395/705 |
| 5,652,889 | 7/1997 | Sites | 395/708 |

OTHER PUBLICATIONS

R. Cmelik, D. keppek "Shade: A Fast instructure Set Simulator for Exectution Profiling", 1994: ACM Sigmetrics Conference.

R. Cmelik, D. Keppel "Shade: A Fast instruction Set Simulator for Execution Profiling", Technical Report UWCSE 93–06 Jun.

T. Halfhill, "Emuation: RISC'Secret Weapon"Byte, pp. 119, 120, 122, 124, 126, 128, 130, Apr. 1994.

*Primary Examiner*—Emmanuel Todd Voeltz
*Assistant Examiner*—Cuong H. Nguyen
*Attorney, Agent, or Firm*—Wei Wei Jeang; L. Joy Griebenow

[57] ABSTRACT

A converter and method (10) for converting an assembly language computer program (12) into a high-level language computer program (20, 22) includes the steps of reading and storing the assembler listing (18) into an array in memory (102), logically tracing said assembler listing (112), determining which lines are reachable logically, and marking reachable and unreachable lines accordingly, and further determining an instruction type for each reachable line and identifying each line by type accordingly (114). A data table having a hierarchy of data elements in said assembler listing is built (118), a data division from said data table is generated (134), and an hierarchy of sections of code caused by perform instructions in said assembler listing are identified and labeled (122, 124). The assembler listing is converted into a source program in said high-level language and unloaded as the high-level language source program from memory.

42 Claims, 5 Drawing Sheets

ASSEMBLY LANGUAGE PROGRAM CONVERTER

TECHNICAL FIELD OF THE INVENTION

This invention is related in general to the field of computer programming. More particularly, the invention is related to a translator and method therefor for translating computer code in a source language, such as assembly language, into code in a high-level target language, such as C and COBOL.

BACKGROUND OF THE INVENTION

Computer programming can be performed in many languages. Some computer languages are high-level languages, which include C, Pascal, Fortran, COBOL, etc. Computer programs in these high-level languages are often easier to understand, code, and debug because of their closer approximation to English. The high-level languages also enjoy a primary advantage of machine independence and portability. For these and other reasons, computer programming in many industries is coded increasingly in high-level languages rather than assembly languages. As a result, the computer programming industry now lacks programmers who can continue to provide support and maintenance for a large volume of application programs already written in assembly languages, such as IBM System 360® and 370®, that has been deployed in many industries. Moreover, because these assembly application programs are complex and of considerable size, rewriting them manually in high-level languages would be extremely expensive. Therefore, a more cost effective way than rewriting the programs is desired.

SUMMARY OF THE INVENTION

Accordingly, there is a need for a converter or translator which translates assembly language application programs to a high-level language, such as C and/or COBOL.

In accordance with the present invention, a converter is provided which eliminates or substantially reduces the disadvantages associated with prior implementations.

In one aspect of the invention, a method for automatically converting an assembly language computer program into a high-level language computer program includes the steps of reading and storing the assembler listing into an array in memory, logically tracing the assembler listing, determining which lines are reachable logically, and marking reachable and unreachable lines accordingly, and further determining an instruction type for each reachable line and identifying each line by type accordingly. A data table having a hierarchy of data elements in the assembler listing is built, a data division from the data table is generated, and an hierarchy of sections of code caused by perform instructions in the assembler listing are identified and labeled. The assembler listing is converted into a source program in the high-level language and unloaded as the high-level language source program from memory.

BRIEF DESCRIPTION OF THE DRAWINGS

For a better understanding of the present invention, reference may be made to the accompanying drawings, in which.

DETAILED DESCRIPTION OF THE INVENTION

The preferred embodiment(s) of the present invention is (are) illustrated in FIGS. 1–6, like reference numerals being used to refer to like and corresponding parts of the various drawings.

Figure 1:
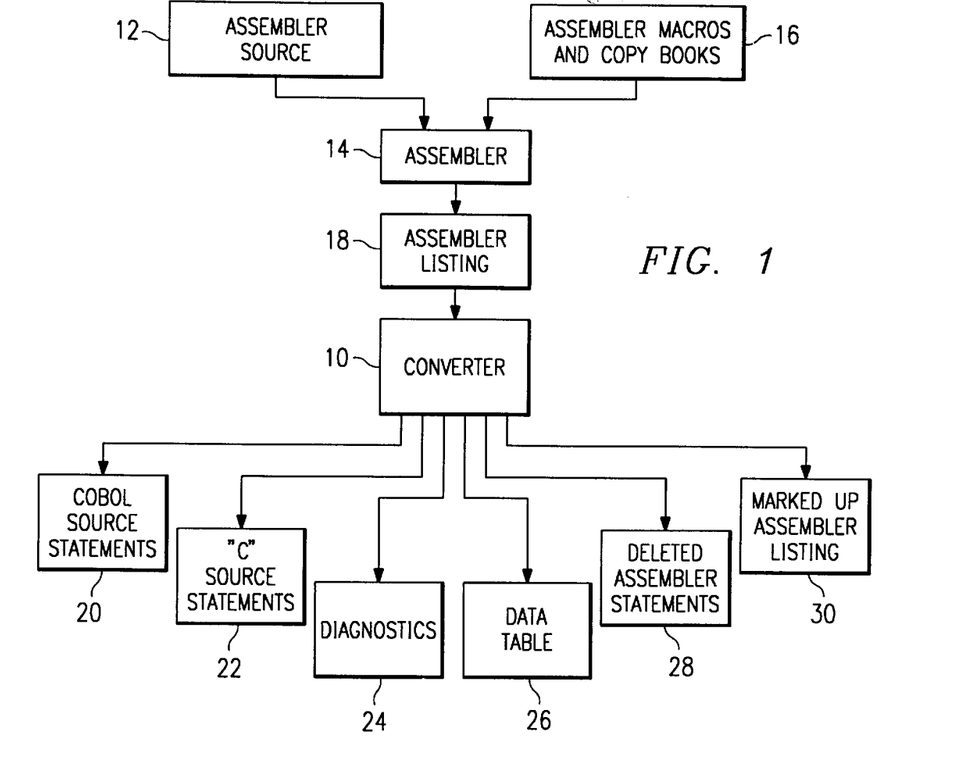
FIG. 1 is a top level block diagram of an assembly to COBOL and/or C converter constructed in accordance with the teachings of the present invention.

Referring to FIG. 1, a computer programming language converter 10, constructed according to the teachings of the present invention, is shown. An assembler source program 12 is "compiled" by an assembler 14. A library of macros and copy books 16 is generally read to complete the assembler source code compilation. An output from the assembler process is the assembler program listing 18, which is used as an input to converter 10. Converter 10 reads program listing 18 and produces a COBOL source program 20 and/or a C source program 22. Source program 20 may be in a particular "dialect" of COBOL, such as COBOL II. In addition, converter 10 may generate a number of work files, including diagnostic messages 24, a data table 26, a listing of assembler source statements that cannot be reached logically or were not processed 28, and the original assembler listing marked up and reorganized. The generation of work files 24–30 may be controlled by setting switches or input parameters of converter 10.

Figure 2A:
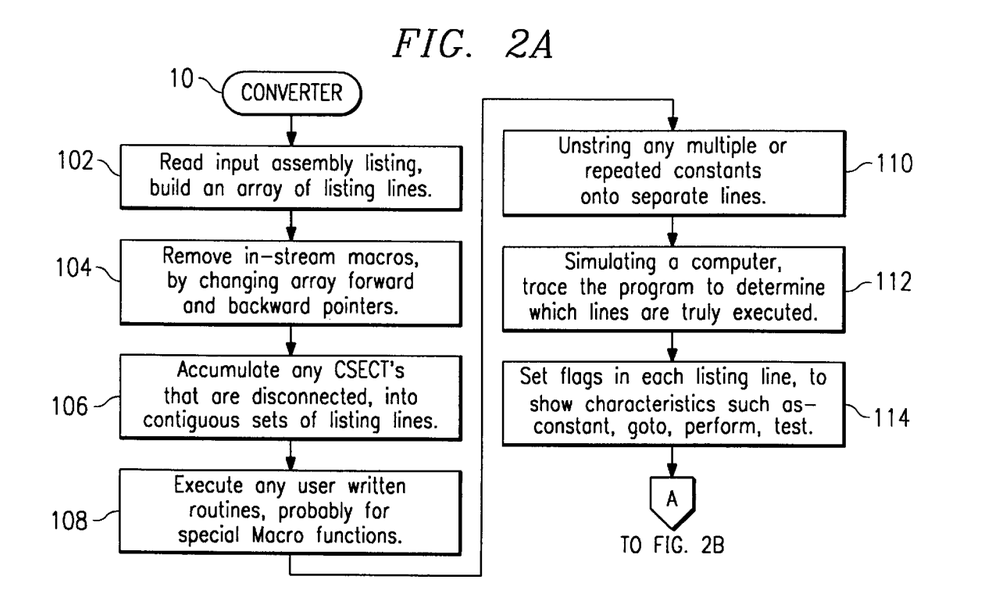
FIGS. 2A and 2B are a simplified flowchart of a conversion process according to the teachings of the present invention.
Figure 3:
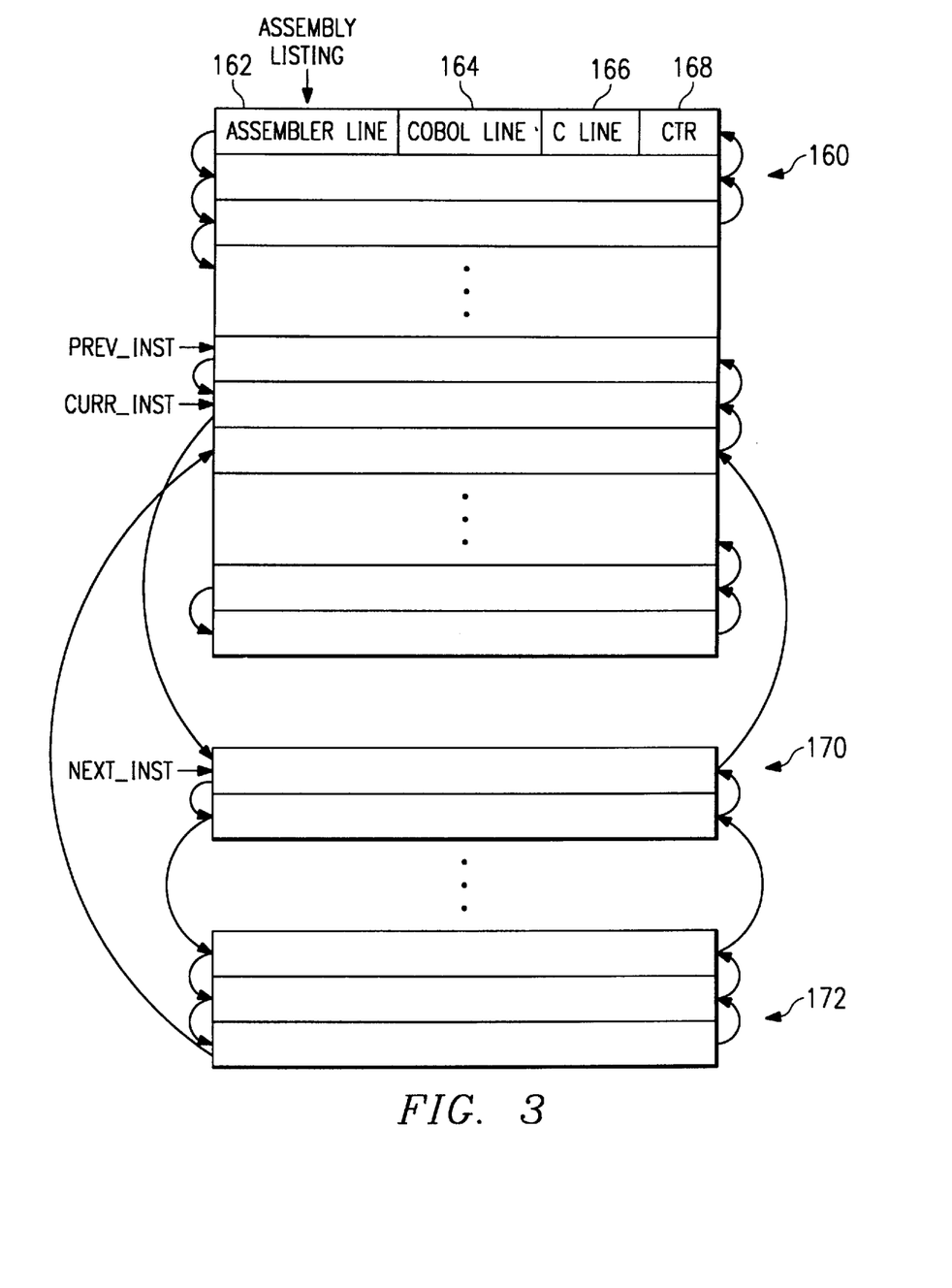
FIG. 3 is a simplified exemplary diagram of an array structure used to hold the source assembly language lines and corresponding target COBOL lines and C lines of the application program.

Referring to FIG. 2A, the conversion process begins in block 10. Converter 10 proceeds to read the assembler listing and build an array for storing the assembler listing lines, as shown in block 102. The assembler listing is the result of running the assembly program through the assembler. FIG. 3 is a logical representation of an exemplary array structure 160 that may be used for this purpose. Each line of the assembler listing is read into memory and retained in listing array 160. Memory space of each line entry of listing array 160 is allocated independently, so that listing array 160 in actuality does not occupy a large contiguous block of memory space. Each entry in listing array 160 includes a field 162 for storing the assembler line, a field 164 for storing the target COBOL line, and a field 166 for storing the target C line. Further, one or more control fields 168 are also provided for each entry. Exemplary control fields and values are shown below:

| ct1_1 | |
|---|---|
| '0' | Comments |
| '1' | Instructions that "fall through", such as MVC (move characters) |
| '2' | DS (define storage) and DC (define constant), except not for "DS 0H" |
| '3' | BR (branch Register), and ABEND SVC |
| '5' | Branch conditionally, a fork (IF-GOTO), including BCT (branch on count) |
| '7' | Branch unconditionally |
| '9' | BAL (branch and link) |

-continued

| | |
|---|---|
| 'Z' | Used by the routine that reads in the whole listing and builds the array, to indicate that this input line is to be skipped | ct1_2

| | |
|---|---|
| '=' | as part of "0===0" set in ct1_1 through ct1_5 to indicate the beginning of an assembler SECTION. |
| '+' | When there is a "test" in assembler that is removed from the conditional branch, an extra IF line must be added to the COBOL program. This is marked "0++*0" in ct1_1 through ct1_5. |
| 'D' | This line is DATA, even though it lies amid op-codes. |
| '\|' | This op-code is the target of a branch or of an ADCON. | ct1_3

| | |
|---|---|
| '1' | CSECT marker |
| '2' | When a branch op-code is to be ignored because of the way it is used in a branch table that is performing the CASE process. |
| '3' | When an instruction is the target of an EX op-code, but cannot be reached otherwise. | ct1_4

| | |
|---|---|
| '=' | Part of "0===0", described above |
| '*' | This is an op-code that sets the system/370 condition code. | ct1_5

| | |
|---|---|
| '0' | Only as part of a "0===0" or "0==80" group; see above. |
| '1' | This op-code is a "fork". |
| '2' | This is an assembler line generated by macro expansion. If we ultimately generate COBOL from the macro as a whole, instead of from the detail macro lines, then all of these detail lines marked '2' will be considered "done" already. |
| '3' | This line is an instruction to the assembler itself, such as PRINT GEN. |
| '4' | Dead code, that cannot be reached and is to be deleted. |
| '7' | This line has a label, the line has no instruction in it, but the line is in the middle of executable logic, and is thus a "real" label that can be branched to, and thus must be preserved. |
| '8' | This is "DATA", not an executable instruction. |
| '9' | Marked by the "trace" routine to show this is an instruction and it logically can be reached by tracing executable instructions. | ct1_6

| | |
|---|---|
| '1' | A data line that the converter added to the list array, such that it will be forced into the COBOL program. The assembler program used the data implicitly; COBOL needs it explicitly. |
| '=' | A line was added to the listing as a "separator". This mainly is used by those who test THE CONVERTER, because the separator line is highly visible while visually scanning a dataset. |
| 'E' | To mark an op-code that is an ENTRY point of the assembler program. |
| 'P' | This is a section that is performed by another section. |
| 'C' | This section is performed. In addition, it has been scanned to see if it performs other sections, and is ready to be completed. |
| '*' | This section has been completed. |
| 'M' | The macro of which this line is a part is to be generated as a whole, and this line will be deleted. |

The use of most of these control fields are set forth below in conjunction with the description of the process flow of the converter.

To traverse the program listing entries sequentially in either direction, forward and backward pointers are provided for each entry. As shown in FIG. 3, there are also pointers pointing to the current instruction (curr_inst), the next instruction (next_inst), and the previous instruction (prev_inst) in listing array 160. Consecutive entries of listing array 160 typically do not occupy contiguous memory locations, as shown by listing array blocks 170 and 172. Additional pointers are also used to identify entry points, forks, branch targets, etc., which are described in more detail below as part of the processes that use them.

Returning to block 102 in FIG. 2A, the assembler listing is read until the END line at the end of the program is reached. Page headers in the assembler listing are skipped. Typically, only assembly lines with sequence numbers in the correct location are stored in listing array 160. Further, lines created by a LTORG (literal origin) assembly statement in a macro expansion are also read and stored in listing array 160. Other lines are discarded and not processed. At the end of processing in block 102, all assembler listing lines are each properly stored in field 162 of each entry in listing array 160.

In block 104, listing lines of in-stream macros are removed from listing array 160. In-stream macros are definitions to the assembler and are not part of the actual assembly program. All listing lines between and including MACRO and MEND (macro end) are removed by changing the forward and backward pointers to skip these lines. Alternatively, the lines associated with these in-stream macros may be skipped while the listing is read in and stored in listing array 160.

Thereafter in block 106, if lines in a CSECT (control section) in the assembler listing are broken up by other CSECTS or DSECTS (data sections), they are regrouped into contiguous listing lines. It is important to note that "contiguous" does not refer to physical contiguity but sequencing or chaining by the use of the forward and backward pointers.

Block 108 provides the opportunity to tailor converter 10 to a specific customer's programming habit or patterns. For example, a company X may perform a specific input/output function by coding a unique macro that is used frequently in its assembly programs. With some advanced knowledge about this macro, special provisions may be made in advance to recognize this macro and translate it accordingly.

In block 110, if an assembly source line has multiple or repeated constants, such as a DC (define constant) or a DS (define storage) statement with multiple operands, it is separated into multiple listing lines by creating extra listing array entries, one for each operand. The forward and backward pointers are adjusted accordingly to accommodate the extra listing lines.

Figure 4:
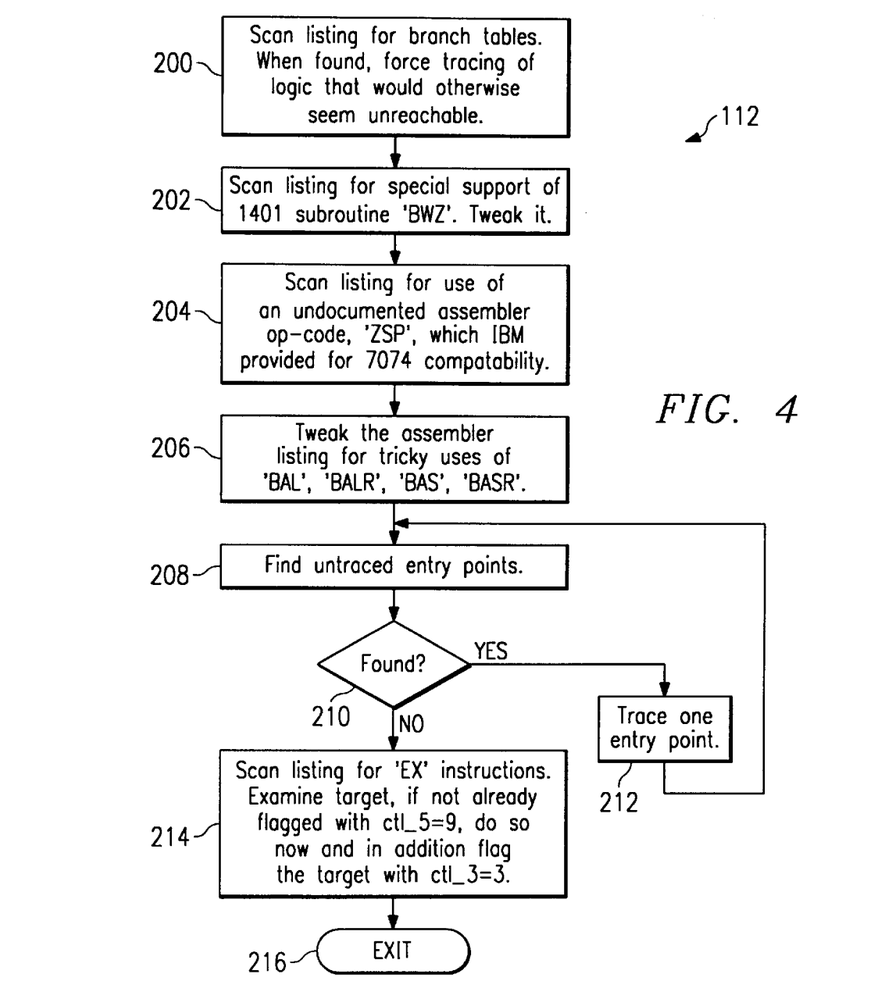
FIG. 4 is a more detailed flowchart of a trace process according to the teachings of the present invention.

The next step is to trace the listing to determine which lines are executable, as shown in block 112. Referring to FIG. 4, showing a more detailed description of this tracing process, the listing is first scanned for branch instructions or branch tables, as shown in block 200. If any branch table is found, then the branch of executable instructions is traced even if its execution seems unlikely during program execution.

The listing is again scanned for any BWZ (branch word-mark zone) macros, as shown in block 202. The BWZ macro was special code written to support the BWZ op code in the 1401 computers when the System 360 computers became available. If a BWZ macro is found, an equivalent COBOL conversion thereof is entered into COBOL line portion 164 of the BWZ instruction entry. Note that extra lines may be created if the COBOL line exceeds one statement.

In block 204, the listing is also scanned for ZSP (zero and subtract packed) macros, which is a special machine language instruction to support the 7074 ZSP op code. A COBOL conversion equivalent is also hard-coded and inserted therein.

In block 206, the listing is also scanned for BAL (branch and link), BALR (branch and link, register), BAS (branch and save), and BASR (branch and save, register) op codes. BAS and BASR op codes are BAL and BALR equivalents and are basically changed to BAL and BALR instructions, respectively, and treated in the same manner.

In block 208, the listing is scanned again by finding any remaining untraced entry point in the program beginning with the first, as shown in block 208. Recall that entry points are marked with its control field ctl_6 set to 'E'. If one is found, as determined in block 210, it is traced, as shown in block 212. Block 212 is expanded in FIG. 5. In block 300, two pointers, latest_fork and curr_inst, are initialized to the untraced entry point or listing line. A boolean variable, keep_going, is also initialized to "yes" or true. In block 302, the value of variable keep_going is checked. If tracing is to continue, as indicated by keep_going, then execution proceeds to block 306, otherwise execution exits and returns to block 208 in FIG. 4.

Figure 5:
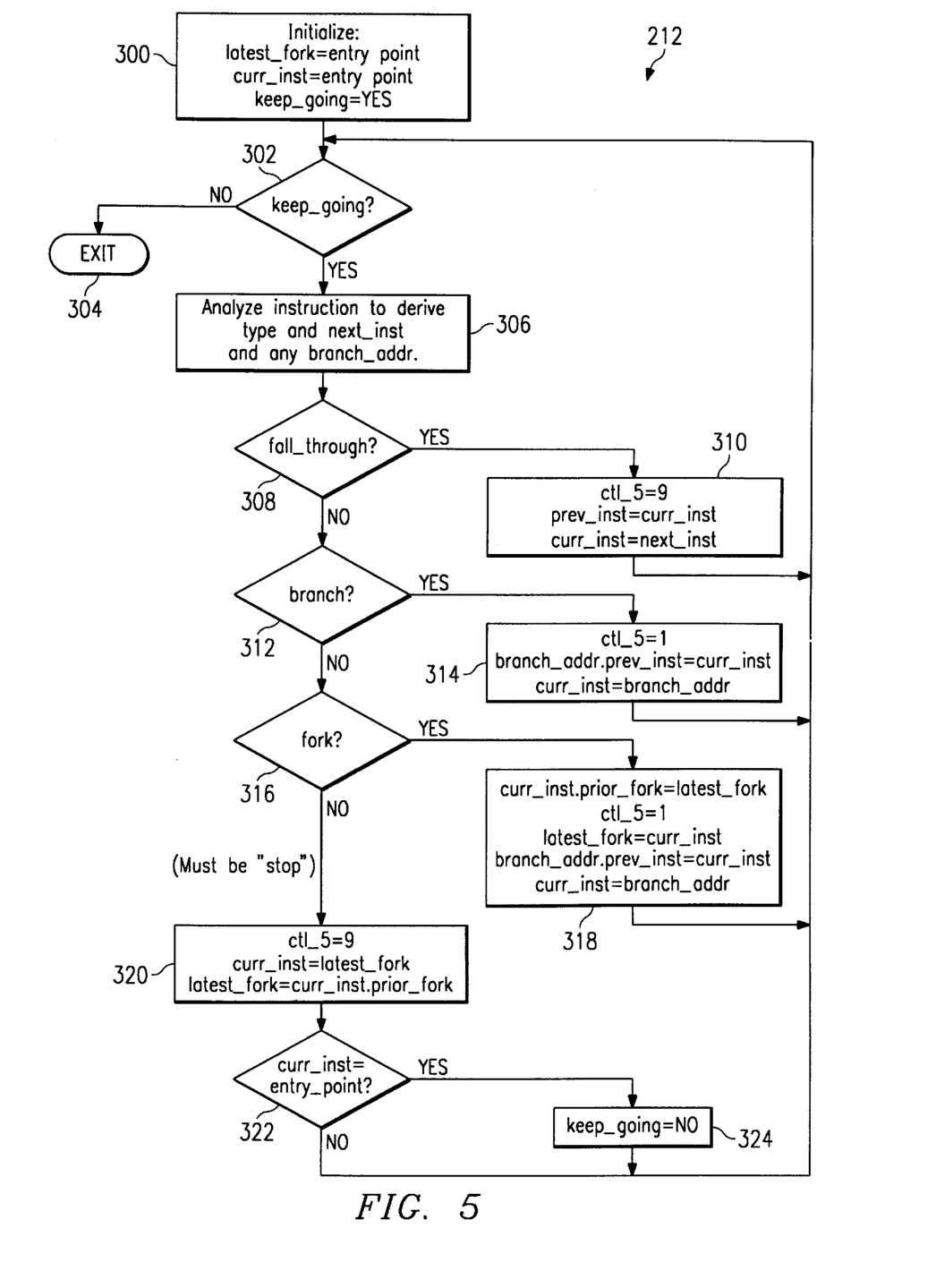
FIG. 5 is a more detailed flowchart of a trace one entry point process according to the teachings of the present invention.
Figure 6:
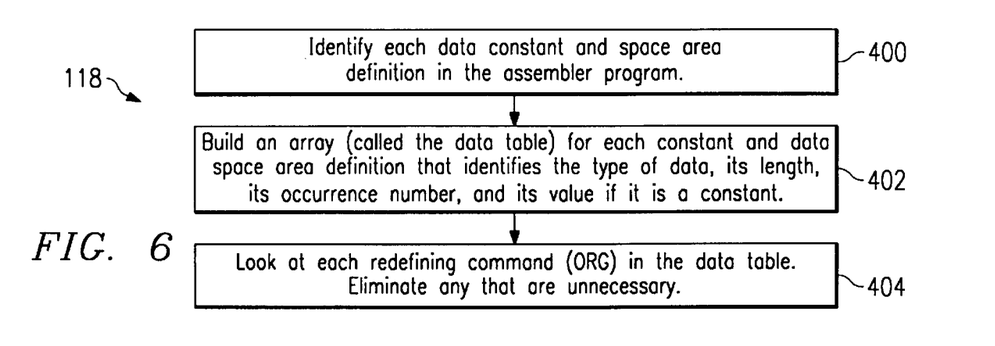
FIG. 6 is a more detailed flowchart of a data table building process according to the teachings of the present invention.

In block 306, the listing line is analyzed to determine the type of entry point, the next instruction pointed to by pointer next_inst following the entry point, and any branch address indicated by pointer branch_addr. If the listing line indicates a fall-through instruction, as determined in block 308, then a control field, ctl_5, is set to 9, and the prev_inst and curr_inst pointers are advanced, in block 310, before returning to block 302. Recall that ctl_5=9 indicates that this instruction can be reached logically by tracing executable instructions as is determined here. A fall-through instruction is merely one that does something and then execution goes on to the very next instruction. If it is not a fall-through instruction, then a further determination is made to see if it is a branch instruction, as shown in block 312. If it is a branch instruction, ctl_5 is set to 1, and a pointer branch_addr.prev_inst is set to the line curr_inst is pointing at and pointer curr_inst is advanced to the branch_addr in block 314 before returning to block 302. Control field ctl_5=1 indicates that the instruction is a fork.

If the current instruction line is not a branch, a further determination is made as to whether it is a fork or a conditional branch, as shown in block 316. If it is a fork, then pointer curr_inst.prior_fork is set to point to the entry pointed to by latest_fork; latest_fork is set to point to the entry pointed to by curr_inst; branch_addr.prev_inst is set to point to the entry pointed to by curr_inst; and curr_inst is set to point to the entry pointed to by branch_addr. The control field ctl_5 is also set to 1.

On the other hand, if the entry is not a fork, then the current instruction must be a "stop." A stop may be a return from a lower level, op code SVC 13 (abnormal program termination), or where an executable op code is followed by a data storage definition. Control field ctl_5 is thus set to 9, curr_inst is set to point to the entry pointed to by latest_fork and latest_fork is set to point to the entry pointed to by curr_inst.prior_fork, as shown in block 320. Thereafter in block 322, a determination is made as to whether curr_inst is set to point to the entry pointed to by entry_point. If yes, keep_going is set to no or false, and execution loops back to block 302. If the determination made in block 322 is no, then execution returns to block 302 directly.

In the process flow shown in FIG. 5, when a path in a fork or branch is traversed, the lines are marked with ctl_5 set to '1'. If a subsequent branch or fork leads to entries with ctl_5='1', then the tracing is in a loop and this portion of the path has been previously traversed. When a "stop" is encountered, all the '1' markings in that portion of the path are then changed to '9', indicating that portion of the path is traced to the end. Each entry point is traced until curr_inst=entry_point and keep_going is set to "no".

Returning to FIG. 4, after all entry points in the program are traced, the listing is again scanned for EX instructions, as shown in block 214. The target entry of The EX instruction is examined to see if it is already flagged with its ctl_5 set equal to 9. If not, the ctl_5 is set to 9 and further its ctl_3 control field is set to 3. The trace process then terminates in block 216.

Returning to FIG. 2A, in block 114, the program listing is again scanned to label each listing line in the proper control field(s) to show what type of operation it is. Examples are constant, go to, perform, test, comment, unexecuted label, etc. Please refer to the control field table set forth above for specific exemplary control fields and values. In the example shown in the control field table, primarily ctl_1 and ctl_5 are used to mark the characteristics of the instruction lines. Further, the listing is scanned for executed machine instructions where there is a plus sign, '+', before the sequence number. The plus signs were set by the assembler to show a macro expansion of a macro. If the macro is a common macro, such as OPEN, CLOSE, READ, and WRITE, then the conversion to COBOL is known and entered into COBOL line portion 164 of the macro line. The machine instructions following the macro line are then marked to indicated that they have been processed.

In block 116, another opportunity for providing special translation for customized code arises, as in block 108 described above. The user logic exit or trap door provides the opportunity to execute customized code designed for a specific customer geared toward resolving specialized code such as macros. After execution of this customized code, execution proceeds to block 118.

In block 118, the listing is again scanned for data elements to build a hierarchy of the data in a data table. The process in block 118 is shown in more detail in FIG. 6. Beginning in block 400, each data constant and space area definition in the assembler program is identified. An array or data table is then built for each constant and data space area definition. The data table specifies the data type, its length, the number of times it occurs, and its value if it is a constant. Thereafter in block 404, a lookup is made for a specific instruction, ORG (origin), that can be used to redefine or rename a storage area that is already defined. Any unnecessary ORG instructions are eliminated from the data table. The data table entries are also chained sequentially by the use of forward and backward pointers so that traversal may be done in either direction.

Returning to FIG. 2B, at block 120, a shell COBOL program is generated. The assembler listing is scanned to search for START or a CSECT. When found, the label specified on that line is inserted into the shell program as the PROGRAM ID. In a similar manner the COBOL program divisions, sections, and background information such as date the program was written, the author's name and the environment are inserted into the shell program. The completed shell program lines are then logically inserted into listing array 160 as extra lines by using the forward and backward chaining pointers.

Figure 2B:
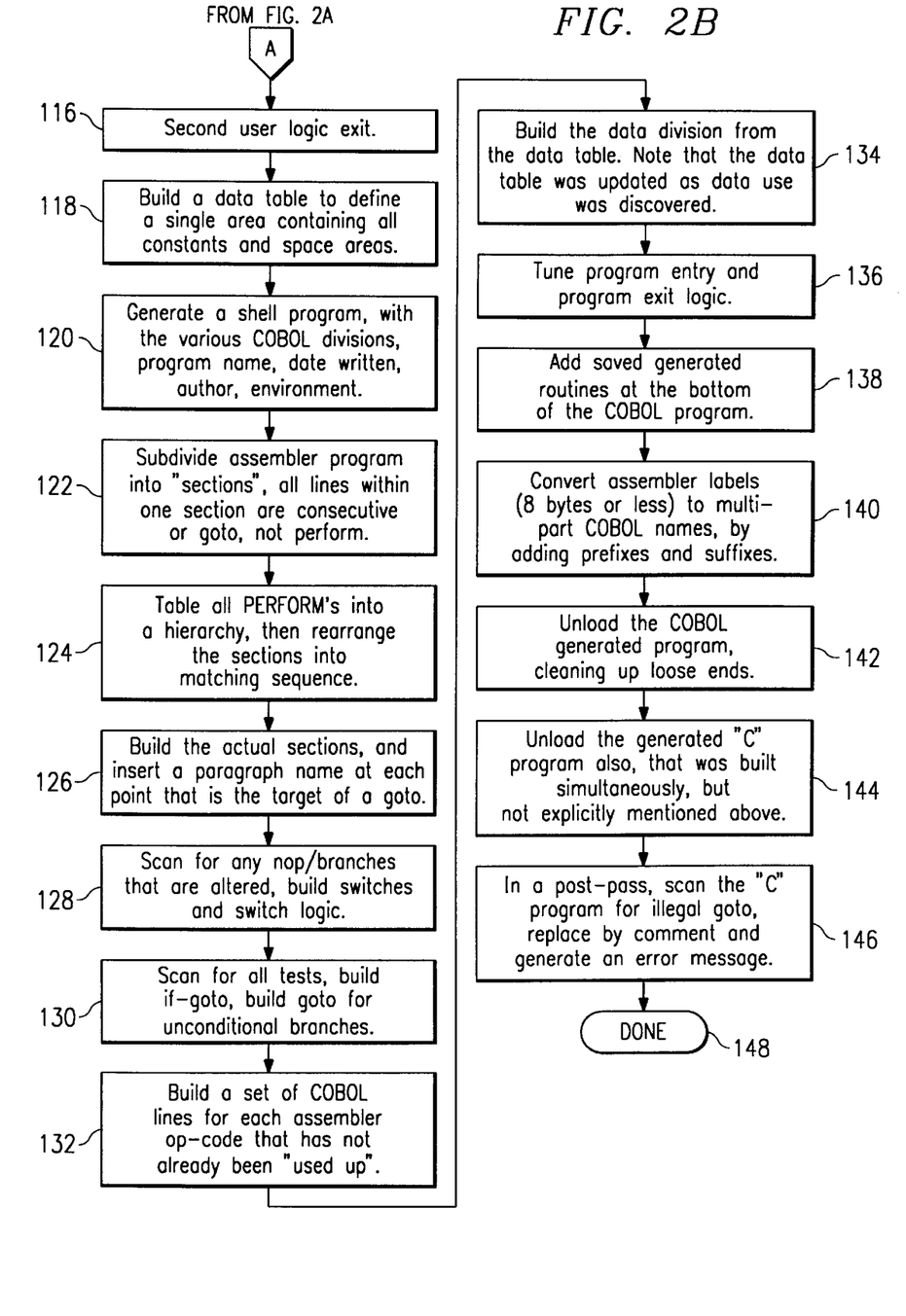

In blocks 122–126, converter 10 performs the task of parsing the assembler listing to discover its structure. The discovered structure is then converted to COBOL. The definition of the desired assembler structure is based on the structure of a well-coded COBOL program, which has a "top down" structure. The top down structure includes a mainline, which is the first SECTION of the procedure division. Generally, the mainline section performs lower level SECTIONs, which in turn perform still lower level SECTIONs. Further, a well-coded COBOL program does not have GO TO statements that leap from one SECTION to another. However, a typical assembler program may jump from place to place and usually does not have well defined levels or SECTIONs. Therefore, in block 122, the assembler listing is parsed and subdivided into SECTIONs.

The assembler program listing is first scanned from the top for the beginning of a control section which may correspond to the beginning of a SECTION in COBOL. A control field of that line is set accordingly, i.e. ctl__3=1. A heuristic rule is used to demarcate the SECTIONS: a COBOL SECTION begins with a CSECT line in assembly and include all lines that can be reached by fall-through, same level branch, same level conditional branch or fork, but not PERFORM (indicated by a BAL or BALR instruction). The PERFORM statement is viewed as a branch to a lower level which is part of a different SECTION, and returns to the next sequential op code when the lower level logic is completed.

When the first executable op code is located, a section start marker is placed immediately before this op code line to mark it as the beginning of an assembler SECTION or partial SECTION. The type of op code the current instruction contains is also determined. Based on the determined type of the current instruction, a decision is made by the present invention as to whether the next instruction can be reached by a fall through or a branch instruction, excluding any branch and link instructions. If the decision is "yes", then the next instruction is considered part of the same section. Else, the section is scanned again to see if an earlier branch or fork has the next instruction as the target. If so, the decision is changed to "yes" and the next instruction is made part of the section. This process continues until the end of the current section is reached. In some cases, this signifies the end of the entire program, when it only has one SECTION. At the end of the current section, the next executable op code is searched for and made the beginning of the next section. Eventually, all executable op codes are examined by this process and the program listing is subdivided into SECTIONS or chunks of code that clearly belong together, where the beginning of each SECTION or partial section is clearly marked in the control fields.

The SECTIONs of code are generally logically linked together by PERFORM instructions. Typically, the first SECTION has one or more PERFORM op codes, which go to other SECTIONs, and the other SECTIONs eventually return. However, what is frequently present is the scenario in which a branch goes from SECTION A to SECTION C, but also that SECTION A does a PERFORM of SECTION B, and SECTION B further does a PERFORM of SECTION C.

In block 124, the hierarchical order of the PERFORMS is identified corresponding to the levels of branching. Further, physically separate chunks of code are gathered together if they are logically part of the same SECTION. If two SECTIONS branch to a single chunk of code, the chunk of code is grouped with the higher level SECTION. In block 124, the listing is scanned for PERFORM statements in the COBOL portion of each listing array entry. These PERFORM statements have been translated from assembly BAL, BALR, BAS, and BASR instructions.

When a PERFORM is found, its branch target section is located and a new section header line is inserted at the beginning of the target with a 'P' entered in ctl__6, indicating that this section is one that is performed by another section, indicative of a lower level branch. This target section is then named by using the name from the PERFORM line and entered into the section header entry. The entire program listing is then scanned, beginning with the entry section to group all physically separate chunks that are branched to by the branch origination chunk. Each grouped section is then scanned for PERFORM statements. Each target chunk of code that is performed is marked by changing the 'P' in ctl__6 to a 'C'. The entire listing is then scanned again to group all target chunks marked with a 'C' with its originating PERFORM section to complete each section. Then each completed section is scanned to locate the target sections each performs, the ctl__6 of these target sections are marked 'C', and the 'C' of the ctl__6 of each originating section is changed to '*'. This process is iteratively continued until all PERFORM branches have been traversed to the end. Safeguards are in place to detect and stop infinite loops such as where, for example, B performs C, but C performs part of the B that performed C.

The process then begins with the ENTRY section of the program, and puts its name in a first slot of a hierarchy table. This first slot represents the top level in the hierarchy. A demarcation or hierarchy sentinel is then used to mark the separation of the top level and the second level. Subsequent slots in the hierarchy table are filled with the names of all the sections performed by the ENTRY section. Another hierarchy sentinel then marks the end of the second level and the beginning of the third. This process continues until all the sections in all the levels of PERFORMS have been entered into the hierarchy table.

When the bottom is reached, the hierarchy table is scanned backward for the very last section name or its occurrence in the lowest level in the table. Any earlier occurrences of the same name are removed from the hierarchy table. Thus, a SECTION that appears at multiple levels only survives at the lowest level. This is done for all the SECTION names. Thereafter, the section in the top level of the hierarchy is given a section prefix, A1, the sections in the next level as B1, B2, . . . By, and sections in the next level as C1, C2, . . . Cz, and so on until the lowest level.

In block 126, the assembler SECTIONS assembled in blocks 122 and 124 are used to build the actual SECTIONS of code. Beginning at the first section and noting its section start marker, a search is made of branch and fork instructions. When one is found, the target of the branch or fork instruction is located. From the target, then the code is traversed backward until a section start marker is located. If this section start marker is the same marker that began the current section, then the branch or fork instruction did not lead to a different section. However, if the markers are not the same, then the code in both sections are grouped together into one section. The second marker is then deleted. This is continued until the mainline section is completed.

Further, in block 126 the name of each SECTION in listing array 160 is modified by adding the SECTION prefix assigned in block 124. Leading comments located between the beginning of each SECTION immediately prior to the first executable instruction are also copied to the COBOL lines. Each PERFORM has its target name completed. The performed routing is looked up in the hierarchy table built in block 124. If found, the SECTION prefix is added to the performed name in the perform line. If the sought name is not in the hierarchy table, then a scan is done to locate the SECTION containing the name, and then the SECTION header is located and used to access the hierarchy table again. The same SECTION prefix is used for the second entry location in the SECTION.

The SECTIONs are then finished by generating a SECTION exit following the last executed instruction of each SECTION. In this manner, each SECTION has an explicit exit instruction. The SECTIONs in the listing array are then reordered according to the numbering scheme in the hierarchy table, with A sections preceding the Bs and then the Cs, etc. and the SECTIONs ordered according to the assigned numbers. Further, the assembler line label is copied into a new line inserted at the beginning of a branch target to be used as a paragraph name. The paragraph name thus has three parts: SECTION prefix, SECTION label, and assembler label. In the absence of an assembler label, a predetermined name is used, such as GOTO0001, with subsequent names serially numbered thereafter.

In block 128, the listing array is again scanned, this time for NOP (no operation) op codes (47Fx and 470x). When one is found, a determination is made by the present invention as to whether there exists anywhere in the program an instruction that alters the third byte of the op code. If so, the instruction functions as a logical switch and is converted to COBOL in the form of:

IF SWITCH IS ON
   GOTO LABEL

Each instruction that modifies the NOP/branch instruction is converted to:

MOVE ON-C TO SWITCH
or
MOVE OFF-C TO SWITCH

The names of the switch and the goto location is created from the assembler labels. In the conversion, switch on is a branch and switch off is a NOP.

In block 130, a scan forward of the listing array is made to locate all remaining 47xx op codes. For 47Fx, an unconditional GOTO statement is generated in the COBOL line. For a NOP, nothing happens, and the NOP instruction is removed and copied to a not-processed file. The not-processed file, at the end of conversion, will contain all instructions that were not converted. A user/programmer may then use the not-processed file to determine which lines of code were not converted by converter 10. For a conditional branch in assembler, multiple COBOL statements are generated to accomplish the same.

In block 132 in FIG. 2B, the listing array is scanned for assembler instructions ED (edit) and EDMK (edit and mark) to create lines in the data table to be used as edit masks. The edit masks allows a COBOL MOVE statement to actually edit numbers into a printable format. Further, the listing array is again scanned for instruction or op codes that have not yet been converted to COBOL, as indicated by the value set in a predetermined control field, they are converted one by one. The resultant COBOL statement is entered in COBOL line portion 164 of each entry line. Each converted line is then marked processed in the control field. An equivalent block is also provided for processing the assembler to C function conversion, in a like manner.

In block 134, the data division of the COBOL and/or C program is built from the data table. The first step is to identify records, DSECTS, tables, and groups within the data table. As these items are found, additional lines are placed in the data table to delineate the beginning and end of these items. To tag DSECTs, a search is made for a DSECT entry in the data table. A DSECT start entry of data_type 'D' is placed just before the DSECT entry in the data table. The DSECT typically continues until another DSECT or CSECT entry is found. An entry of data_type 'D_END' is then made in the data table indicating the end of the DSECT has been reached. If a DSECT is found that is the continuation of another DSECT, it is moved in the table by adjusting forward and backward pointers, so that the entire DSECT is contiguous in the data table.

Next, group fields are tagged. Group fields are data storage areas with an occurs factor of zero ('0'). Once the beginning and ending of a group is determined, two new entries are added to the data table. An entry of data_type of 'G' with a length equal to the length of the group is entered directly before the start of the group. An entry of data_type of 'G-END' is entered directly after the end of the group.

Note that a group ends when storage equal to or greater than the length on the zero occurs statement is reached. Groups cannot overlap. If while searching for the end of a group, a field is found or another zero occurs entry is found that extends beyond the end of the current group, then the current group is ended. To end the current group in this situation, a filler is added to finish the current group, and an ORG (redefine) back to the start of the original group is entered following the filler. A filler is further added after the ORG statement to get the location counter back to that of the field or new group that started the overlap. Reprocessing of the current group is then redone with these adjustments. While the addition of fillers and the ORG creates additional data levels and filler in the COBOL program, it does produce a COBOL program that contains all the labeled fields from the assembler code and maintain the integrity of the locations and lengths of each data field.

After groups have been tagged, redefine areas are tagged. A redefine area begins with an ORG statement. A group start entry is entered in the data table preceding the field that is the target of the ORG statement. The length of this group is determined by finding the largest location difference between the location of the ORG statement and the location of the ORG target. A group end entry is placed after the last field of the last ORG pointing to the current target that is part of the redefining area. Once the redefine groups have been tagged, any overlaps amongst them, or between them and data groups which were tagged earlier, must be eliminated. This is done by forcing the overlap to become one group. This group will start at the top of the group highest in the overlap and end at the bottom of the group lowest in the overlap.

After clearing the group overlaps, COBOL level numbers are assigned to the items in the data table. This is done by finding a group level, getting the length of the group from the data table, and setting the level of fields below it to the next lowest COBOL data level until storage equaling the length of the group has been found. Upon finding the start of records or DSECTs, the level number resets so that these items begin with level 01 in the COBOL output.

As part of setting levels, any ORG statements that violate the rules of COBOL are resolved. If a situation is detected where an ORG statement is not valid in COBOL, an area is 'elevated' so that proper redefinition may be accomplished. Elevation is performed by creating a higher level group that contains everything down to the redefines. The redefinition then redefines this new area, instead of just the first field of the area. If a redefine statement due to an ORG is found such that elevation will not solve the problem, the redefining area is moved in the data table so that it follows the area that it redefines. If it is found that another move must be made before the entire area making up the first move is completed, the ORG is to be processed manually and is so flagged.

After setting the levels, a pass is preferably made through the data table to determine if there are any groups that are purely filler with no labels to see if they can be removed. This is done to keep the COBOL program as uncluttered as possible.

The data division is then built by grouping areas in the data table into three basic categories: FDs (file definition), major 01 groups, and single storage slots. Data areas that are part of FDs are processed first, which were earlier identified. Their start is found by looking for list entries with '01$' beginning in the eighth position of the 'cobol_line' field in the list entry. Major 01 groups are DSECTs or group areas that are not part of DSECTs. As data fields are built into the data division, they are marked in the list array as having been processed. Anything that has not been processed as being part of an 'FD' or 'major 01 group' is put into a general working storage section of the data division and is given data level 05. These items are also categorized as being work areas or constants by the use of the suffix '-W' or '-C'. Converter 10 keeps track of whether these fields were part of instructions that would modify their contents as the procedural instructions were processed. If the field was ever the object of an instruction that would have modified its contents, it is suffixed with a '-W'. If not, then its suffix is '-C'.

A check is then made to see if any work complexes need to be generated. These include work register complexes (register definition and redefinition as binary, character, and double register), packed work areas, binary work areas, and zoned decimal work areas. These areas are necessary because of the way data has been defined and used in the assembler program. Generally, the way data is defined in assembler has no effect on how it can be used. However, COBOL has definite rules that must be followed. Redefinitions of data areas are used to allow converter 10 to satisfy these rules.

In block 136, the program entry and exit logic is tuned by inserting a GOBACK and a GO TO. Preferably, the COBOL lines are further "cleaned out" by removing junk code created from assembler op codes in ENTRY initialization.

In block 138, generated code for user logic (blocks 108 and 116) are inserted. The assembler END statement is searched for, then COBOL instructions previously parked in procedure_lines is copied.

In block 140, converter 10 converts assembler labels to multi-part COBOL names by scanning the COBOL lines until PROCEDURE DIVISION is found. Then every line except comments is processed. First, the line is un-strung and the '%' sign is searched for. Prefix and/or suffix information is then added to the labels and then re-strung back together again. If a C program is also being generated, the C labels are also upgraded by changing from upper case to lower case.

In block 144, the code in listing array 160 is unloaded into three files. Those non-processed lines are unloaded to the not-processed file. The assembler lines are reconstructed in the re-ordered logical sequence, and written to an output file. The COBOL line portions of each assembler line is unloaded to a COBOL output file. The data table may also be unloaded for debugging and/or program analysis purposes. Similarly as shown in block 146, the C program is also unloaded with invalid goto statements removed to a C output file. The illegal C statement is written out as a comment instead of executable code. This step avoids premature execution termination of the converted C program due to errors. Converter 10 then ends in block 148.

It may be instructive to note that while it may not be explicitly set forth above, there is usually a C counterpart for an assembler-to-COBOL conversion operation or step. Therefore, if a C program is a desired output of converter 10, then what is performed to convert to COBOL is usually also performed for the C conversion. A library of run time C functions is also provided for execution with the converted C program. These C functions in the run time library simulate the functionality of certain known assembler instructions or chunks of code.

Although the present invention and its advantages have been described in detail, it should be understood that various changes, substitutions and alterations can be made therein without departing from the spirit and scope of the invention as defined by the appended claims.

What is claimed is:

1. A computer-implemented method for converting an assembler listing into a high-level language computer program, comprising the steps of:

reading and storing said assembler listing in an array in memory;

logically tracing said assembler listing, determining which lines are logically reachable, and accordingly marking reachable lines;

grouping said lines into at least one section in said assembler listing;

determining an hierarchy of said sections caused by perform instructions in said assembler listing and accordingly labeling each section; and converting lines of said assembler listing into a source program in said high-level language and storing in said memory.

2. The method, as set forth in claim 1, wherein said logical tracing step includes the steps of:

analyzing each assembler listing line and locating branch instructions;

logically tracing down paths created by each branch instruction until the end thereof; and marking each line in each traced path accordingly.

3. The method, as set forth in claim 1, further comprising the steps of:

building a data table having a hierarchy of data elements in said assembler listing; and building a data division from said data table.

4. The method, as set forth in claim 3, wherein said data table building step further includes the steps of:

identifying each data constant and space area definition;

building an array for each identified constant and space area definition; and storing in said array a data type and data length for each identified constant and space area definition.

5. The method, as set forth in claim 1, further comprising the step of identifying and removing from said array any in-stream macros.

6. The method, as set forth in claim 1, further comprising the step of identifying known macros and substituting therefor functions implemented in said high-level program language.

7. The method, as set forth in claim 1, wherein said section hierarchy determining step includes the steps of identifying and demarcating sections of code.

8. The method, as set forth in claim 7, wherein said section identifying and demarcating step includes the steps of:

searching, from a beginning of said assembler listing, for an executable instruction;

placing a section start marker before said executable instruction and determining its instruction type;

determining whether a next instruction after said executable instruction is logically reachable by a fall-through instruction or a branch instruction but not a PERFORM instruction;

grouping said next instruction with said executable instruction as part of a section; and continuing said above steps until a STOP instruction is reached indicative of an end of said section and the beginning of a next section.

9. The method, as set forth in claim 8, further comprising the steps of:

scanning forward, from a first section start marker, for a branch or fork instruction;

locating a target of said branch or fork instruction;

scanning backward, from said target, for a second section start marker; and combining code in section starting with said second section start marker with said section starting with said first section start maker if said second section start marker is not the first section start marker.

10. The method, as set forth in claim 1, wherein said section hierarchy determining step includes the steps of:

identifying PERFORM instructions;

identifying a target section for each of said PERFORM instructions; and labeling said target section as a lower level section than said PERFORM statements branching thereto.

11. The method, as set forth in claim 10, wherein said section hierarchy determining step further includes the step of traversing each PERFORM target section and any PERFORM target section included therein until all PERFORM target sections are traversed to the end.

12. The method, as set forth in claim 10, further comprising the steps of:

constructing a section hierarchy table;

entering into said section hierarchy table section names of said sections; and removing, from said section hierarchy table, all occurrences of each section name except for the very last occurrence.

13. The method, as set forth in claim 1, further comprising the step of providing a trap door in said generated high-level computer language program for executing specialized custom code.

14. The method, as set forth in claim 1, wherein each line of said memory array includes:

an assembler line portion;

a high-level language line portion; and a plurality of control fields for marking each line and flagging certain predetermined conditions.

15. The method, as set forth in claim 14, wherein each line of said memory array further comprises a second high-level language line portion.

16. The method, as set forth in claim 1, further comprising the step of subdividing said assembler listing into sections.

17. The method, as set forth in claim 16, wherein said subdividing step includes the step of grouping in each section fall-through instructions, same level branch instructions, same level conditional branch instructions, but not PERFORM instructions.

18. The method, as set forth in claim 1, further comprising the steps of:

identifying NOP instructions;

determining if any instruction in said assembler listing alters said NOP instruction during execution; and substituting said NOP instruction with a switch statement in response to the existence of said NOP altering instruction.

19. The method, as set forth in claim 1, further comprising the steps of:

identifying any instruction in said assembler listing that cannot be readily converted into said high-level computer language; and supplying and inserting a hard-coded function performing said instruction into said memory array.

20. The method, as set forth in claim 1, further comprising the step of marking any unprocessed lines as unprocessed for writing to an output file.

21. A computer-implemented method for converting an assembly language computer program into a high-level language computer program, comprising the steps of:

assembling the assembly language computer program with an assembler and generating an assembler listing;

reading and storing said assembler listing in an array in memory, each line of said array being chained to its logical neighbors by forward and backward pointers;

grouping lines of each control section in said assembler listing together;

logically tracing said assembler listing, determining which lines are logically reachable, and accordingly marking reachable lines;

determining an instruction type for each reachable line and accordingly identifying each line by type;

building a data table having a hierarchy of data elements in said assembler listing;

determining an hierarchy of sections of code caused by branch instructions in said assembler listing and accordingly labeling each section;

building a data division from said data table; and converting lines of said assembler listing into lines of a source program in said high-level language and storing in said memory.

22. The method, as set forth in claim 21, wherein said logical tracing step includes the steps of:

analyzing each assembler listing line and locating branch instructions;

logically tracing down paths created by each branch instruction until the end thereof; and marking each line in each traced path accordingly.

23. The method, as set forth in claim 21, wherein said data table building step further includes the steps of:

identifying each data constant and space area definition;

building an array for each identified constant and space area definition; and storing in said array a data type and data length for each identified constant and space area definition.

24. The method, as set forth in claim 21, further comprising the step of identifying and removing from said array any in-stream macros.

25. The method, as set forth in claim 21, further comprising the step of identifying known macros and substituting therefor functions implemented in said high-level program language.

26. The method, as set forth in claim 21, wherein said section hierarchy determining step includes the steps of identifying and demarcating sections of code.

27. The method, as set forth in claim 26, wherein said section identifying and demarcating step includes the steps of:

searching, from a beginning of said assembler listing, for an executable instruction;

placing a section start marker before said executable instruction and determining its instruction type;

determining whether a next instruction after said executable instruction is logically reachable by a fall-through instruction or a branch instruction but not a PERFORM instruction;

grouping said next instruction with said executable instruction as part of a section; and continuing said above steps until a STOP instruction is reached indicative of an end of said section and the beginning of a next section.

28. The method, as set forth in claim 27, further comprising the steps of:

scanning forward, from a first section start marker, for a branch or fork instruction;

locating a target of said branch or fork instruction;

scanning backward, from said target, for a second section start marker; and combining code in section starting with said second section start marker with said section starting with said first section start maker if said second section start marker is not the first section start marker.

29. The method, as set forth in claim 21, wherein said section hierarchy determining step includes the steps of:

identifying PERFORM instructions;

identifying a target section for each of said PERFORM instructions; and labeling said target section as a lower level section than said PERFORM statements branching thereto.

30. The method, as set forth in claim 29, wherein said section hierarchy determining step further includes the step of traversing each PERFORM target section and any PERFORM target section included therein until all PERFORM target sections are traversed to the end.

31. The method, as set forth in claim 29, further comprising the steps of:

constructing a section hierarchy table;

entering into said section hierarchy table section names of said sections; and removing, from said section hierarchy table, all occurrences of each section name except for the very last occurrence.

32. The method, as set forth in claim 21, further comprising the step of providing a trap door in said generated high-level computer language program for executing specialized custom code.

33. The method, as set forth in claim 21, wherein each line of said memory array includes:

an assembler line portion;

a high-level language line portion; and a plurality of control fields for marking each line and flagging certain predetermined conditions.

34. The method, as set forth in claim 33, wherein each line of said memory array further comprises a second high-level language line portion.

35. The method, as set forth in claim 21, further comprising the step of subdividing said assembler listing into sections.

36. The method, as set forth in claim 35, wherein said subdividing step includes the step of grouping in each section fall-through instructions, same level branch instructions, same level conditional branch instructions, but not PERFORM instructions.

37. The method, as set forth in claim 21, further comprising the steps of:

identifying NOP instructions;

determining if any instruction in said assembler listing alters said NOP instruction during execution; and substituting said NOP instruction with a switch statement in response to the existence of said NOP altering instruction.

38. The method, as set forth in claim 21, further comprising the steps of:

identifying any instruction in said assembler listing that cannot be readily converted into said high-level computer language; and supplying and inserting a hard-coded function performing said instruction into said memory array.

39. The method, as set forth in claim 38, wherein said instruction identifying step includes the step of identifying BWZ instructions.

40. The method, as set forth in claim 38, wherein said instruction identifying step includes the step of identifying ZSP instructions.

41. The method, as set forth in claim 38, wherein said instruction identifying step includes the step of identifying BAL, BALR, BAS and BASR instructions.

42. The method, as set forth in claim 21, further comprising the step of marking any unprocessed lines as unprocessed for writing to an output file.

* * * * *